A. SCHACHAT.
BENCH LATHE GRINDING MACHINE.
APPLICATION FILED DEC. 1, 1916.
1,237,254.
Patented Aug. 14, 1917.
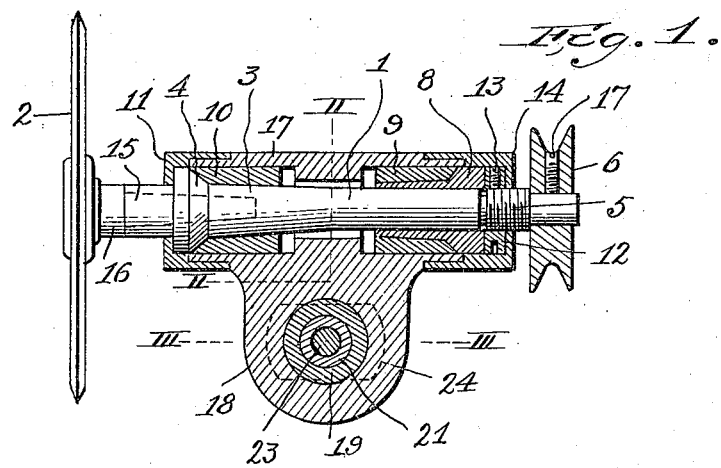
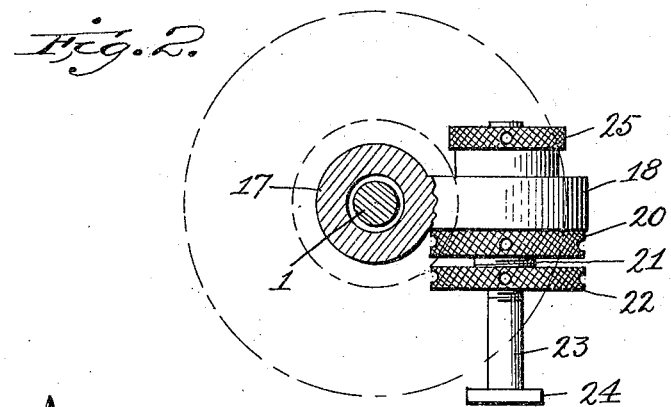
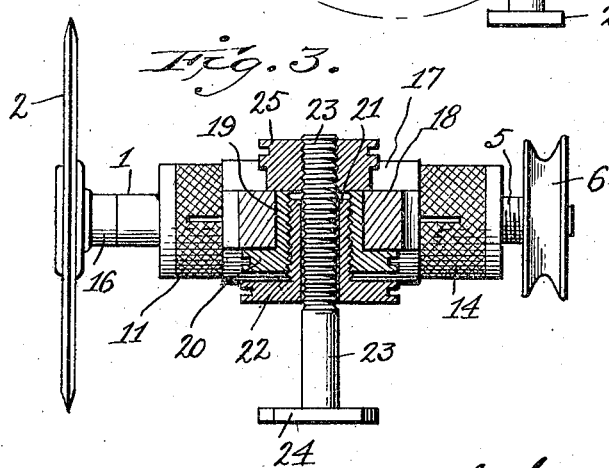
Witness
Edwin L. Yewell
Inventor
Abraham Schachat
By Leroy B. Hills
Attorney

UNITED STATES PATENT OFFICE.

ABRAHAM SCHACHAT, OF BROOKLYN, NEW YORK, ASSIGNOR TO SLOCUM, AVRAM & SLOCUM, LABORATORIES, INC., OF NEW YORK, N. Y., A CORPORATION OF NEW YORK.

BENCH-LATHE GRINDING-MACHINE.

1,237,254.

Specification of Letters Patent.

Patented Aug. 14, 1917.

Application filed December 1, 1916. Serial No. 134,410.

*To all whom it may concern:*

Be it known that I, ABRAHAM SCHACHAT, a citizen of the United States, residing at Brooklyn, in the county of Kings and State of New York, have invented certain new and useful Improvements in Bench - Lathe Grinding-Machines, of which the following is a specification.

My invention relates to grinding machines, adapted more particularly for use in connection with bench-lathes, and has for its objects, first, to provide certain improvements in the construction of the mechanism for attaching the device to a bench-lathe and for adjusting the grinding-wheel; and, secondly, to provide certain improvements in the mounting of the spindle of the grinding-wheel.

These objects I accomplish in the manner and by the means hereinafter described and claimed, reference being had to the accompanying drawing, in which:—

Figure 1 is a central horizontal sectional view of my improved device, the grinding-wheel spindle being shown in elevation.

Fig. 2 is a sectional view taken on the line II—II of Fig. 1.

Fig. 3 is a vertical sectional view taken on the line III—III of Fig. 1.

Similar numerals of reference denote corresponding parts in the several views.

In the said drawing, the reference numeral 1 denotes the grinding-wheel carrying spindle, the same being formed toward that end nearest the grinding-wheel 2 into slightly conical shape, as indicated at 3, and having a conical collar 4 formed thereon, as shown. Near its other end said spindle is threaded at 5, and at its reduced outer end receives a grooved driving pulley 6, which is locked on said spindle by means of a set-screw 7. Mounted on the spindle 1 at the pulley end is an inside cone-bearing 8, upon the exterior of which is mounted a bushing 9. At the grinding-wheel end of said spindle is mounted a bushing 10, adapted to fit the coned portion 3 and conical collar 4, as shown, said parts being retained in position by the dust-cap 11. At the other end the cone-bearing 8 and its bushing 9 are retained in position by a nut 12, in screw-threaded engagement with the screw-threaded portion 5 of the spindle, said nut being locked in position by means of the set-screw 13, and the parts at this end being covered by a removable dust-cap 14 similar to the dust-cap 11 at the opposite end. The grinding-wheel 2 is fixed in position in the spindle 3 by the frictional engagement therein of the shank 15 of the grinding-wheel carrier 16. The spindle 3 and its cone-bearings and other parts are all inclosed in a casing 17, upon the reduced end portions of which the dust-caps 11 and 14 are fitted, as shown.

In order to provide for attaching the device to a bench-lathe, the casing 17 is provided with an integral offset portion 18 at one side, which is best seen in detail in Fig. 3, and which is centrally apertured to receive freely movable therein the hub 19 of an adjusting nut 20, the latter being apertured and internally screw-threaded to receive an adjusting screw 21, formed with a nut 22, and apertured to receive freely therein an adjusting screw-bolt 23, which carries at its lower end a T-head 24, adapted to fit in the usual tool post slot of a lathe cross-slide. Said bolt 23 receives at its upper end in threaded engagement therewith a lock-nut 25.

This portion of the device operates as follows:—

The T-head 24 is inserted into the tool post slot, and is clamped in position by screwing down the adjusting nut 22 in a manner readily understood. In order to adjust the casing 17 vertically, and thereby adjust the grinding-wheel 2 to the work, the upper nut 25 will be loosened, and the lower nut 20 adjusted upon the nut 22 vertically to bring the casing 17 to the desired position, whereupon the parts may be clamped by screwing down the upper nut 25, as readily will be understood.

Having thus described my invention, what I claim as new and desire to secure by Letters Patent, is:—

1. In a grinding machine, the combination with the casing thereof, of a common means carried by said casing for clamping it to a bench lathe and for adjusting said casing toward and from its point of support in said bench lathe.

2. In a grinding machine, the combination with the casing thereof, of an adjusting nut having a hub engaging said casing, and a common means operating in connection with said nut and hub for clamping said casing to a bench lathe and for adjusting said casing toward and from its point of support on said bench lathe.

3. In a grinding machine, the combination with the casing thereof, of an adjusting nut having a hub engaging said casing, a clamping nut in screw-threaded engagement with the interior of said adjusting nut, a screw bolt passing freely through said clamping nut and headed at its lower end, and a lock nut in screw-threaded engagement with said screw bolt at its upper end and operating in conjunction with said adjusting nut to clamp the casing therebetween, said clamping nut operating in conjunction with the headed end of said screw bolt to clamp the device to a bench lathe.

In testimony whereof, I hereunto set my hand this day 29th of November, 1916.

ABRAHAM SCHACHAT.

Copies of this patent may be obtained for five cents each, by addressing the "Commissioner of Patents, Washington, D. C."